United States Patent
Talmo et al.

[11] 3,805,377
[45] Apr. 23, 1974

[54] METHOD OF MAKING A TRANSDUCER

[75] Inventors: Robert Eugene Talmo, Pasadena; Edward R. Brady, Sierra Madre, both of Calif.

[73] Assignee: International Telephone and Telegraph Corporation, New York, N.Y.

[22] Filed: Apr. 18, 1973

[21] Appl. No.: 352,121

[52] U.S. Cl................ 29/610, 65/59, 156/272, 338/2
[51] Int. Cl............................................. A01c 17/00
[58] Field of Search ....... 29/592, 595, 610 SG, 584, 29/589, 590, 585, 621, 470; 219/148; 156/272, 273, 275; 338/2, 5; 73/88.5 SD

[56] References Cited
UNITED STATES PATENTS

| | | | |
|---|---|---|---|
| 3,197,335 | 7/1965 | Laszynski | 338/2 X |
| 3,314,035 | 4/1967 | Sanchez | 338/5 X |
| 3,327,270 | 6/1967 | Garrison | 338/2 |
| 3,397,278 | 8/1968 | Pomerantz | 29/589 X |
| 3,417,459 | 12/1968 | Pomerantz | 29/589 X |
| 3,585,461 | 6/1971 | Eynon | 29/589 X |
| 3,605,258 | 9/1971 | Fisher et al. | 29/603 |
| 3,713,068 | 1/1973 | Talmo | 338/2 |

*Primary Examiner*—Charles W. Lanham
*Assistant Examiner*—Victor A. DiPalma
*Attorney, Agent, or Firm*—A. Donald Stolzy

[57] ABSTRACT

A method of fabricating a transducer including a leaf spring cantilever kovar beam. Glass, which preferably is 7740 Pyrex glass, is sputtered onto opposite surfaces of the beam to form two layers, strain gage leads are then sputtered onto the layers. A silicon strain gage is then bonded to each layer. The bonds not only fix the strain gages relative to the layers and beam, permanent electrical connections are made between the strain gages and the sputtered leads simultaneously as the bonds are made. The sputtered leads overcome serious inaccuracies and lead wire breakage due to vibration. The inaccuracies are variant and are caused by conventional lead wire supports and certain differentials in thermal expansion.

8 Claims, 8 Drawing Figures

PATENTED APR 23 1974                                              3,805,377
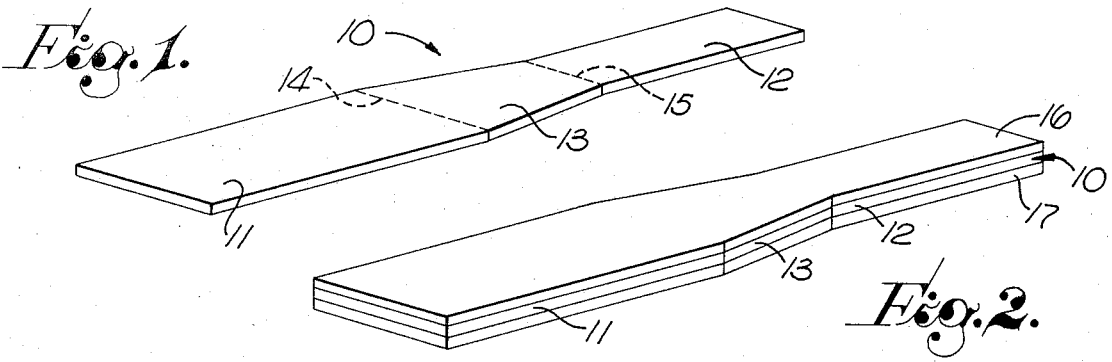
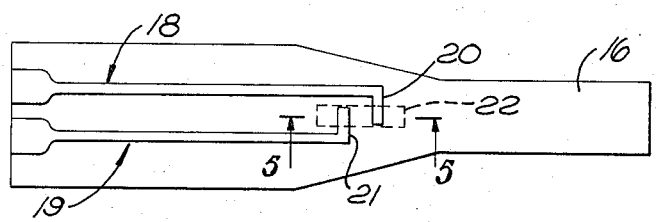
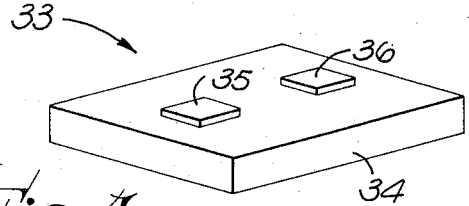
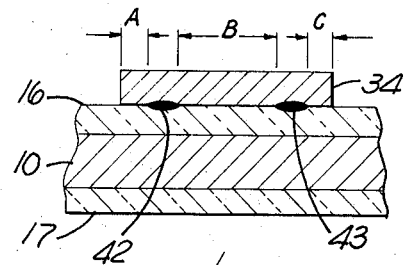
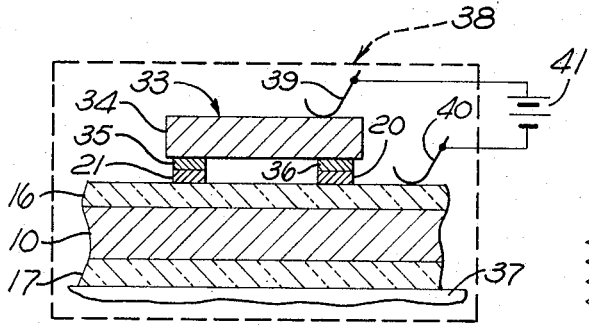
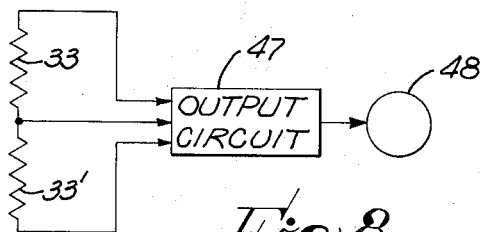
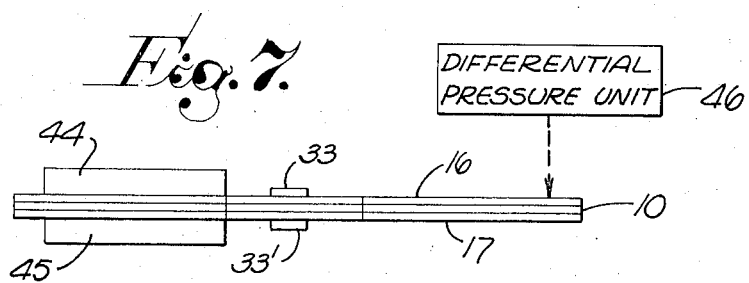

3,805,377

METHOD OF MAKING A TRANSDUCER

BACKGROUND OF THE INVENTION

This invention relates to the transducer art, and more particularly, to a method of fabricating a transducer.

In the past it has been the practice to construct a transducer by fixing one end of a leaf spring cantilever beam. A strain gage is then bonded to each side of the beam. The beam is then deflected in accordance with, for example, differential pressure. The strain gages are connected in Wheatstone bridge. The output of the bridge is amplified and converted to a current which is passed through a milliammeter calibrated in differential pressure. Such an arrangement is disclosed, for example, in U.S. Pat. No. 3,518,886.

In the prior art, the strain gage leads have generally been fixed to the beam with an epoxy. Further, it is undesirable to encapsulate each entire lead because of differential thermal expansion and mechanical creep.

The prior art lead wires are relatively large compared to the structures adjacent thereto. Lead movement due to thermal expansion, therefore, causes the said inaccuracies. That is, the strain gages are improperly stressed by the leads.

Moreover, portions of the prior art leads are free to vibrate and are, thus, subject to breakage either from shock or from fatigue.

SUMMARY OF THE INVENTION

In accordance with the method of the present invention, the above-described and other disadvantages of the prior art are overcome by bonding a strain gage to a beam with glass having metal film leads bonded thereto. The glass-to-metal bond of the film leads, thus, securely holds the leads in place. Moreover, secure strain gage-to-glass and strain gage-to-lead bonds are made simultaneously and, thus, in a minimum time with a minimum effort.

The above-described and other advantages of the present invention will be better understood from the following detailed description when considered in connection with the accompanying drawings.

BRIEF DESCRIPTION OF THE DRAWINGS

In the drawings which are to be regarded as merely illustrative:

FIG. 1 is a perspective view of a leaf spring cantilever beam;

FIG. 2 is a perspective view of the beam of FIG. 1 with glass layers on the upper and lower surfaces thereof;

FIG. 3 is a top plan view of the construction of FIG. 3 with sputtered strain gage leads deposited thereon;

FIG. 4 is a perspective view of a strain gage;

FIG. 5 is a vertical sectional view of an assembly in a furnace;

FIG. 6 is a sectional view of the assembly of FIG. 5 with parts thereof bonded together;

FIG. 7 is a side elevational view of a construction which may be employed with the present invention; and FIG. 8 is a diagrammatic view of a system constructed in accordance with the present invention.

DESCRIPTION OF THE PREFERRED EMBODIMENT

In the drawings, in FIG. 1, a leaf spring cantilever beam is illustrated at 10. Beam 10 may be entirely conventional. Beam 10 has a portion 11 and a portion 12 joined by a portion 13. Portion 13 is conventional and is called a constant strain region. The lengthwise extremities of portion 13 are illustrated by dotted lines 14 and 15.

In accordance with the method of the present invention, glass layers 16 and 17 are sputtered onto the upper and lower surfaces of beam 10, as shown in FIG. 2. The sputtering method of bonding layers 16 and 17 to beam 10 may be entirely conventional. As will be described, strain gages are bonded to the upper and lower surfaces of layers 16 and 17, respectively, over and below beam portion 18. However, before this bonding step is performed, leads are sputtered onto the upper and lower surfaces of layers 16 and 17, respectively. Each strain gage may be bonded to each corresponding one of the layers 16 and 17 either simultaneously, or in separate steps, as desired.

After the construction of FIG. 2 has been made, metal leads 18 and 19 are sputtered onto the upper surface of layer 16, as shown in FIG. 3. If desired, the lower surface of layer 17 may be provided with leads sputtered thereon in a pattern identical to the pattern of leads 18 and 19 in FIG. 3.

In FIG. 3, leads 18 and 19 have transverse end portions 20 and 21, respectively, spaced apart. The strain gage on top of layer 16 and on the bottom of layer 17 is bonded to the respective layers 16 and 17 in the dotted line position illustrated at 22 in FIG. 3.

A number of the component parts of the transducer shown in the drawings have actual sizes or have relative sizes which are illustrated much larger than they actually are. These exaggerations have been made for clarity. For example, a strain gage 33 is illustrated in FIG. 4. The strain gage employed is normally much smaller than that as illustrated in FIG. 4. Strain gage 33 includes a monocrystalline silicon block 34 having tabs 35 and 36 electrically and mechanically bonded thereto.

Tabs 35 and 36 in FIG. 4 are preferably spaced lengthwise of block 34 equal to the spacing of transverse portions 20 and 21 of leads 18 and 19, respectively. If desired, leads 18 and 19 may have a width uniform throughout the entire lengths. The width of lead 19 may be equal to the width of lead 18, if desired. If desired, tabs 35 and 36 may each have an upper area, as viewed in FIG. 4, equal to the width of lead 18 squared.

Beam 10, with layers 16 and 17 and the leads 18 and 19 sputtered thereon, is placed on a support 37 in a furnace 38, as shown in FIG. 5. Strain gage 33 is then placed on layer 16 with tabs 35 and 36 in contact with lead transverse portions 21 and 20, respectively. Spring wire electrodes 39 and 40 are then placed in electrical and pressure contact with the upper surfaces of block 34 and layer 16, as illustrated in FIG. 5.

The assembly shown in FIG. 5 inside oven 38 is then heated to a temperature between about 320 and 360 degrees Centigrade. After this assembly is up to temperature, a D.C. source of potential 41 is connected between electrodes 39 and 40, the positive pole of source 41 being connected to electrode 39, and the negative pole of source 41 being connected to electrode 40. After this, the assembly inside oven 38 may be allowed to cool. The structure may then appear as in FIG. 6 where there is a bond between layer 16 and block 34 in the areas A, B and C. Tab 35 will then be held in electrical and pressure contact with lead transverse portion 21 at 42. Similarly, tab 36 will be held in electrical and pressure contact with lead transverse portion 20 at 43.

After two strain gages have been bonded to the respective layers 16 and 17, as indicated at 33 and 33' in FIG. 7, the left end of beam 10 may be fixed between fixed supports 44 and 45, as shown in FIG. 7. A conventional differential pressure unit 46 may be employed to deflect beam 10, as shown.

In FIG. 7, connections from leads 18 and 19 at the left end of beam 10, as viewed in FIG. 7, may be made in any conventional manner. Note will be taken that any flexible lead connections thereat will not move with beam 10 because beam 10 is essentially fixed at the location between supports 44 and 45.

Strain gages 33 and 33' may be connected to an output circuit 47, as shown in FIG. 8. The output of circuit 47 may then be connected to a milliammeter 48 calibrated in differential pressure, if desired. However, any utilization means may be substituted for milliammeter 48. Such utilization means may or may not provide visual indication, as desired. Alternatively, such utilization may or may not be a process controller.

Output circuit 47 may be identical to that shown in the said patent. Alternatively, circuit 47 may be conventional, but different from that shown in the said patent. A voltmeter may be substituted for milliammeter 48 in some cases.

The prior art problems outlined hereinabove occur because, in the prior art, conventionally, the lead wires are 2 mils in diameter. Sometimes, block 34 may be only one-half mil thick. Beam 10 might be 7 mils thick. Each of the glass layers 16 and 17 may be only 0.2 mil thick. The prior art leads were, thus, a substantial disadvantage because they were so large in comparison to the structure surrounding them.

Glass layers 16 and 17 are preferably sputtered. However, glass layers 16 and 17 may be bonded to beam 10 by the method disclosed in copending application Ser. No. 150,502 filed June 7, 1971, by R. E. Talmo for BONDED ASSEMBLIES AND METHODS OF MAKING THE SAME.

It is not necessary to sputter leads 18 and 19. Many methods of conventional deposition may be employed. Evaporation or vacuum deposition is possible.

By this reference hereto, the entire disclosure of said copending applcation is hereby incorporated herein as though set forth in full herein at this point.

Preferably glass layers 16 and 17 are made of Corning 7740 Pyrex glass.

Preferably, beam 10 is made of kovar. Beam 10 may also be made of Ni-Span-C, if desired. Beam 10 may also be made of any other suitable material, if desired.

Source 41 preferably supplies a difference of potential between electrodes 39 and 40 of between about 150 and 1,000 volts.

Tabs 35 and 36 of strain gage 33 and leads 18 and 19 are preferably made of gold or an alloy thereof, although this conductive material need not necessarily be so made. The same is true of the tabs, not shown, on strain gage 33'.

Preferably, strain gages 33 and 33' are identical and are temperature matched gages. The materials of the leads, not shown, on the lower surface of glass layer 17 are preferably, but not necessarily, made of the same material of which leads 18 and 19 are made.

Preferably, oven 38 in FIG. 5 is a hydrogen oven. If oven 38 does not contain hydrogen, it preferably contains an inert gas such as nitrogen or argon or otherwise. The word "inert gas" is, therefore, hereby defined for use herein and in the claims to mean any gas which does not undesirably react with the assembly inside oven 38, shown in FIG. 5.

In FIG. 5, if the structure inside oven 38 is up to temperature before source 41 is connected to electrodes 39 and 40, when the difference of potential is applied, the current from source 41 will immediately rise to a peak value of perhaps 50 microamperes. The current will then typically decline exponentially with time to about 5 microamperes. It may take about 5 minutes for this decline. When the current has fallen after the peak to about 60 percent of the peak value, the bond between block 34 and glass layer 16 will generally have been made so that these components may be cooled, and source 41 disconnected from electrodes 39 and 40. The parts may also then be removed for further assembly.

If source 41 is connected to electrodes 39 and 40 after the parts are up to temperature, from the time source 41 is so connected, th process of obtaining a bond will usually take from about 2 to 20 minutes.

The method of bonding block 34 to glass layer 16 may be in many respects identical to the methods described in U.S. Pat. Nos. 3,397,278 and 3,417,459.

Glass layers 16 and 17 should have a thickness adequate to withstand voltage breakdown or arcing when the voltage of source 41 is applied to electrodes 39 and 40.

To make it abundantly clear, the relative thicknesses of the tabs 35 and 36, and the transverse lead portions 21 and 20 are much less than as illustrated in FIGS. 4 and 5. Moreover, in FIG. 5, the lower surface of block 34, as viewed in FIG. 5, will lie contiguous to the upper surface of glass layer 16, as viewed in FIG. 5, and the lower surface of block 34 may sometimes or at all times actually touch or contact the upper surface of glass layer 16. Thus, block 34 sometimes may not be separated from block 34 by tabs 35 and 36, and transverse lead portions 21 and 20. For example, in some cases, tabs 35 and 36, and leads 18 and 19, may have thicknesses less than, equal to or little greater than a few microns.

What is claimed is:

1. The method of making a transducer, said method comprising the steps of: bonding a layer of glass to one side of a leaf spring cantilever beam; bonding two conductive film strips to said layer in positions insulated from each other and extending from an intermediate portion of said layer to one end thereof with the ends of said strips in said portion spaced a predetermined distance; placing said beam on a support with said layer on top of said beam; placing a silicon strain gage over said glass with the ends thereof contiguous to the respective ends of said strips in said layer portion and said layer portion; placing first and second electrodes on top of and in contact with said strain gage and said layer, respectively; heating said beam, said layer, said strips and said strain gage to a predetermined temperature; and connecting a source of potential between said electrodes while said beam, said layer, said strips and said strain gage are heated as aforesaid and for a length of time to produce a bond between said layer and said strain gage, said strips having a thickness sufficiently small to allow said strain gage to lie close enough to said glass layer when said strain gage contacts said strips to permit said heating and connectin steps to effect a bond between said layer and said strain gage, the strain gage bond to said layer holding the strain gage in electrical and pressure contact with the ends of said strips in said glass layer intermediate portion.

2. The method of claim 1, wherein said predetermined temperature is between about 320 360 degrees Centigrade.

3. The method of claim 2, wherein said source is a D.C. source of potential, the psotiive pole of which is connected to said first electrode and the negative pole of which is connected to said second electrode, said beam being made of kovar, said glass being Corning 7740 Pyrex glass.

4. The method of claim 3, wherein said heating step is performed in a hydrogen atmosphere.

5. The method of claim 4, wherein said glass layer is sputtered onto said beam, said strips being sputtered onto said layer, said strips being made of a material containing gold, said strain gage having spaced gold containing tabs bonded thereto in a position to contact the respective strips when said strain gage is placed contiguous to said layer, said tabs also having a thickness sufficiently small to allow said strain gage to lie close enough to said glass layer when said tabs contact the respective strips to permit said heating and connecting steps to effect a bond between said layer and said strain gage.

6. The method of claim 1, wherein said source is a D.C. source of potential, the positive pole of which is connected to said first electrode and the negative pole of which is connected to said second electrode, said beam being made of kovar, said glass being Corning 7740 Pyrex glass.

7. The method of claim 6, wherein said heating step is performed in an atmosphere of an inert gas.

8. The method of claim 2, wherein said heating step is performed in an atmosphere of an inert gas.

* * * * *